United States Patent
Schoeneberger et al.

(10) Patent No.: US 7,616,742 B2
(45) Date of Patent: Nov. 10, 2009

(54) BANDWIDTH REDUCTION IN A VOIP NETWORK USING MUSIC ON HOLD

(75) Inventors: Carl Schoeneberger, Dallas, TX (US); Michael P. Dimitroff, Sunnyvale, CA (US)

(73) Assignee: Intervoice, Inc., Dallas, TX (US)

( * ) Notice: Subject to any disclaimer, the term of this patent is extended or adjusted under 35 U.S.C. 154(b) by 837 days.

(21) Appl. No.: 10/840,821

(22) Filed: May 6, 2004

(65) Prior Publication Data

US 2005/0249192 A1    Nov. 10, 2005

(51) Int. Cl.
*H04M 1/64* (2006.01)

(52) U.S. Cl. ............... 379/88.17; 379/76; 379/265.02; 370/353

(58) Field of Classification Search ............. 379/88.17, 379/88.18, 101.01, 265.01–266.03; 370/353
See application file for complete search history.

(56) References Cited

U.S. PATENT DOCUMENTS

| | | | |
|---|---|---|---|
| 5,282,243 A | 1/1994 | Dabbaghi et al. ............ 379/201 |
| 5,459,780 A | 10/1995 | Sand ............................ 379/265 |
| 5,530,744 A | 6/1996 | Charalambous et al. ..... 379/265 |
| 6,049,603 A | 4/2000 | Schwartz et al. ............ 379/309 |
| 6,122,364 A | 9/2000 | Petrunka et al. ............. 379/265 |
| 6,141,341 A * | 10/2000 | Jones et al. .................. 370/352 |
| 6,144,667 A | 11/2000 | Doshi et al. ................. 370/401 |
| 6,188,673 B1 | 2/2001 | Bauer et al. ................. 370/252 |
| 6,289,001 B1 | 9/2001 | Smyk ........................... 370/216 |
| 6,298,383 B1 | 10/2001 | Gutman et al. .............. 709/229 |
| 6,301,480 B1 | 10/2001 | Kennedy, III et al. ........ 455/445 |
| 6,330,326 B1 | 12/2001 | Whitt ..................... 379/265.13 |
| 6,337,858 B1 * | 1/2002 | Petty et al. ................... 370/356 |
| 6,400,804 B1 * | 6/2002 | Bilder ........................... 379/76 |
| 6,463,148 B1 | 10/2002 | Brady .................... 379/265.01 |
| 6,493,695 B1 | 12/2002 | Pickering et al. ............. 706/47 |
| 6,584,191 B1 | 6/2003 | McPartlan et al. ..... 379/265.02 |

(Continued)

FOREIGN PATENT DOCUMENTS

WO    WO 01/35601 A1    5/2001

(Continued)

OTHER PUBLICATIONS

"Signaling Gateway CX6100-SG", Haraski et al., pp. 138-142, NEC Res & Develop., vol. 42, No. 2, Apr. 2001.

(Continued)

*Primary Examiner*—Simon Sing
(74) *Attorney, Agent, or Firm*—Fulbright & Jaworski L.L.P.

(57) ABSTRACT

The present invention is a method and system for reducing bandwidth usage in a voice over internet protocol (VoIP) network that uses holding sounds such as music or announcements. When a customer call enters the network through a gateway, the call is received by a media server (VMS) and a workflow is started. When the workflow determines that the customer call is to be put on hold, the VMS sends an instruction signal to the gateway, instructing the gateway to provide an on-hold music or announcement to the customer call. When the workflow determines that the customer call is to be taken off hold, the VMS sends a second instruction signal to the gateway and the gateway stops the music or announcements and proceeds to further process the call under the direction of the workflow.

46 Claims, 5 Drawing Sheets

U.S. PATENT DOCUMENTS

| | | | |
|---|---|---|---|
| 6,600,735 B1 | 7/2003 | Iwama et al. | 370/352 |
| 6,614,902 B1 | 9/2003 | Rizzetto | 379/265.11 |
| 6,615,235 B1 | 9/2003 | Copeland et al. | 709/203 |
| 6,639,982 B1 | 10/2003 | Stuart et al. | 379/266.03 |
| 6,665,395 B1 | 12/2003 | Busey et al. | 379/265.09 |
| 6,678,718 B1 | 1/2004 | Khouri et al. | 709/204 |
| 6,697,858 B1 | 2/2004 | Ezerzer et al. | 709/224 |
| 6,704,409 B1 | 3/2004 | Dilip et al. | 379/265.02 |
| 6,704,412 B1 | 3/2004 | Harris et al. | 379/269 |
| 6,724,884 B2 | 4/2004 | Jensen et al. | 379/265.01 |
| 6,741,698 B1 | 5/2004 | Jensen | 379/265.02 |
| 6,771,765 B1 | 8/2004 | Crowther et al. | 379/265.09 |
| 6,778,494 B1* | 8/2004 | Mauger | 370/230 |
| 6,781,959 B1 | 8/2004 | Garakani et al. | 370/242 |
| 6,823,382 B2 | 11/2004 | Stone | 709/224 |
| 6,850,599 B2 | 2/2005 | Yoshitani | 379/37 |
| 6,850,613 B2 | 2/2005 | McPartlan et al. | 379/265.02 |
| 6,868,059 B1 | 3/2005 | Jones et al. | 370/216 |
| 6,937,715 B2 | 8/2005 | Delaney | 379/265.09 |
| 7,035,252 B2* | 4/2006 | Cave et al. | 370/356 |
| 7,035,874 B1* | 4/2006 | Reed et al. | 707/104.1 |
| 7,085,263 B1* | 8/2006 | Fitzgerald | 370/352 |
| 7,151,827 B2* | 12/2006 | Scott et al. | 379/265.02 |
| 7,173,911 B1* | 2/2007 | Sarkar et al. | 370/252 |
| 7,209,475 B1* | 4/2007 | Shaffer et al. | 370/355 |
| 2001/0024497 A1* | 9/2001 | Campbell et al. | 379/265.09 |
| 2001/0024997 A1 | 9/2001 | Sugano et al. | 477/2 |
| 2002/0026515 A1 | 2/2002 | Michielsens | |
| 2002/0071541 A1 | 6/2002 | Cheung et al. | 379/215.01 |
| 2004/0054743 A1 | 3/2004 | McPartlan et al. | 709/206 |
| 2004/0066923 A1* | 4/2004 | Robinson | 379/166 |
| 2004/0141508 A1 | 7/2004 | Schoeneberger et al. | 370/401 |
| 2004/0221053 A1 | 11/2004 | Codella et al. | 709/231 |

FOREIGN PATENT DOCUMENTS

WO     WO 01/61529 A2     8/2001

OTHER PUBLICATIONS

"Media Gateway CX-3200", Naoki Satoh et al., pp. 133-137, NEC Res & Develop., vol. 42, No. 2, Apr. 2001.

"*Message Classification in the Call Center*", by Stephan Busemann, Sven Schmeier, and Roman G. Arens. Published in Saarbrucken, Germany, pp. 158-165.

"*The Modernization of a Call Center*", by Karen Reasoner, University of Wyoming, Client Support Services, Information Technology, Laramie WY. 82070, pp. 270-273.

"*Redefining the Call Center: Customer Service on the Internet*", by D. Steul from San Francisco, Ca., pp. 38-42.

International Search Report & Written Opinion for PCT/US05/08345 dated Sep. 26, 2006.

* cited by examiner

BANDWIDTH REDUCTION IN A VOIP NETWORK USING MUSIC ON HOLD

FIELD OF THE INVENTION

The present invention relates generally to the field of Voice over Internet Protocol (VoIP). More specifically, the present invention relates to the field of bandwidth reduction in a VoIP network.

BACKGROUND OF THE INVENTION

When the underlying voice media of a Contact Center is VoIP, an incoming customer call is received at a gateway. The incoming call is split into a session initiation protocol (SIP) portion and a real time protocol (RTP) portion, sent to a media server (VMS) and a workflow is started for that customer call. The SIP portion of the call contains control signaling to facilitate the routing of the call while the RTP portion of the call contains the actual voice data. In current VoIP networks, when the workflow determines that the customer call is to be on hold, the VMS provides an on-hold playback to the customer through the gateway until the workflow determines that the customer call is to be taken off hold. Because the on-hold playback requires bandwidth for each caller on hold for a continuous amount of time, this system can consume a large amount of bandwidth when many callers are on hold.

The problem with this type of system is apparent and magnified when the VoIP network is connected across large distances through the use of wide area networks (WANs). For example, when a VoIP network has a gateway in a first city, but the customer call received in that gateway is properly routed to a VMS in a second city through a WAN, the on-hold playback must be transmitted continuously through the WAN and the gateway to the caller. Because WAN bandwidth is expensive, and on-hold calls consume bandwidth while the on-hold playback is continuously playing, current systems are unnecessarily expensive and inefficient.

SUMMARY OF THE INVENTION

The present invention is a method and system for reducing bandwidth usage in a voice over internet protocol (VoIP) network that uses holding sounds such as music or announcements. When a customer call enters the network through a gateway, the call is received by a media server (VMS) and a workflow is started. When the workflow determines that the customer call is to be put on hold, the VMS sends an instruction signal to the gateway, instructing the gateway to provide an on-hold music or announcement to the customer call. When the workflow determines that the customer call is to be taken off hold, the VMS sends a second instruction signal to the gateway and the gateway stops the music or announcements and proceeds to further process the call under the direction of the workflow.

One aspect of the present invention includes a method of reducing bandwidth usage in a voice over internet protocol network comprising receiving a customer call in a gateway from a network, routing the customer call to a server and sending an instruction signal from the server to the gateway, wherein the instruction signal prompts the gateway to start or stop an on-hold playback from the gateway to a customer. The method further comprises starting a workflow when the customer call is routed to the server, wherein the workflow determines when the instruction signal is sent to the gateway, an on-hold playback track, an announcement stack and an announcement frequency. The instruction signal is a start playback signal when the customer call is put on hold, further wherein the start playback signal prompts the gateway to start the on-hold playback. The instruction signal is an end playback signal when the customer call is taken off hold, further wherein the end playback signal prompts the gateway to stop the on-hold playback.

The method further comprises saving an interruption point of the on-hold playback when the end playback signal prompts the gateways to stop the on-hold playback, starting a message or a caller prompt after the end playback signal is sent and connecting the customer call to an agent after the end playback signal is sent. When the agent places the customer on hold, the instruction signal is re-sent from the server to the gateway to start the on-hold playback from the gateway to the customer, and the on-hold playback starts from the interruption point. The instruction signal is sent to the gateway over a local connection or over a wide area network. The network is a time division multiplexed network such as a public switched telephone network or the network is a voice over internet protocol network.

Another aspect of the present invention includes a system for reducing bandwidth usage in a voice over internet protocol network comprising means for receiving a customer call from a network, means for routing the customer call to a server and means for instructing the gateway, wherein the instructing means prompts the gateway to start or stop an on-hold playback from the gateway to a customer. The system further comprises means for starting a workflow when the customer call is routed to the server, wherein the workflow determines when the instructing means prompts the gateway, an on-hold playback track, an announcement stack and an announcement frequency. The instructing means sends a start playback signal when the customer call is put on hold, further wherein the start playback signal prompts the gateway to start the on-hold playback. The instructing means sends an end playback signal when the customer call is taken off hold, further wherein the end playback signal prompts the gateway to stop the on-hold playback.

The system further comprises means for saving an interruption point of the on-hold playback when the end playback signal prompts the gateways to stop the on-hold playback, means for starting a message or a caller prompt after the end playback signal is sent and means for connecting the customer call to an agent after the end playback signal is sent. When the agent places the customer on hold, the instructing means prompts the gateway to start the on-hold playback from the gateway to the customer, and the on-hold playback starts from the interruption point. The instructing means prompts the gateway over a local connection or over a wide area network. The network is a time division multiplexed network such as a public switched telephone network or the network is a voice over internet protocol network.

Another aspect of the present invention includes a system for reducing bandwidth usage in a voice over internet protocol network comprising a gateway configured to receive a customer call from a network, and further configured to route the customer call and a server coupled to the gateway, wherein the server is configured to receive the customer call from the gateway, and further configured to send an instruction signal to the gateway, wherein the instruction signal prompts the gateway to start or stop an on-hold playback from the gateway to a customer. The system further comprises a workflow configured to be started when the customer call is routed to the server, wherein the workflow determines when the instruction signal is sent to the gateway, an on-hold playback track, an announcement stack and an announcement frequency.

The instruction signal is a start playback signal when the customer call is put on hold, further wherein the start playback signal prompts the gateway to start the on-hold playback. The instruction signal is an end playback signal when the customer call is taken off hold, further wherein the end playback signal prompts the gateway to stop the on-hold playback. The gateway records an interruption point of the on-hold playback when the end playback signal prompts the gateways to stop the on-hold playback. A message or a caller prompt is started after the end music playback is sent. The customer call is connected to an agent after the end playback signal is sent. When the agent places the customer on hold, the instruction signal is re-sent from the server to the gateway to start the on-hold playback from the gateway to the customer, and the on-hold playback starts from the interruption point. The instruction signal is sent to the gateway over a local connection or a wide area network. The network is a time division multiplexed network such as a public switched telephone network or the network is a voice over internet protocol network.

DETAILED DESCRIPTION OF THE PREFERRED EMBODIMENT

Figure 1:
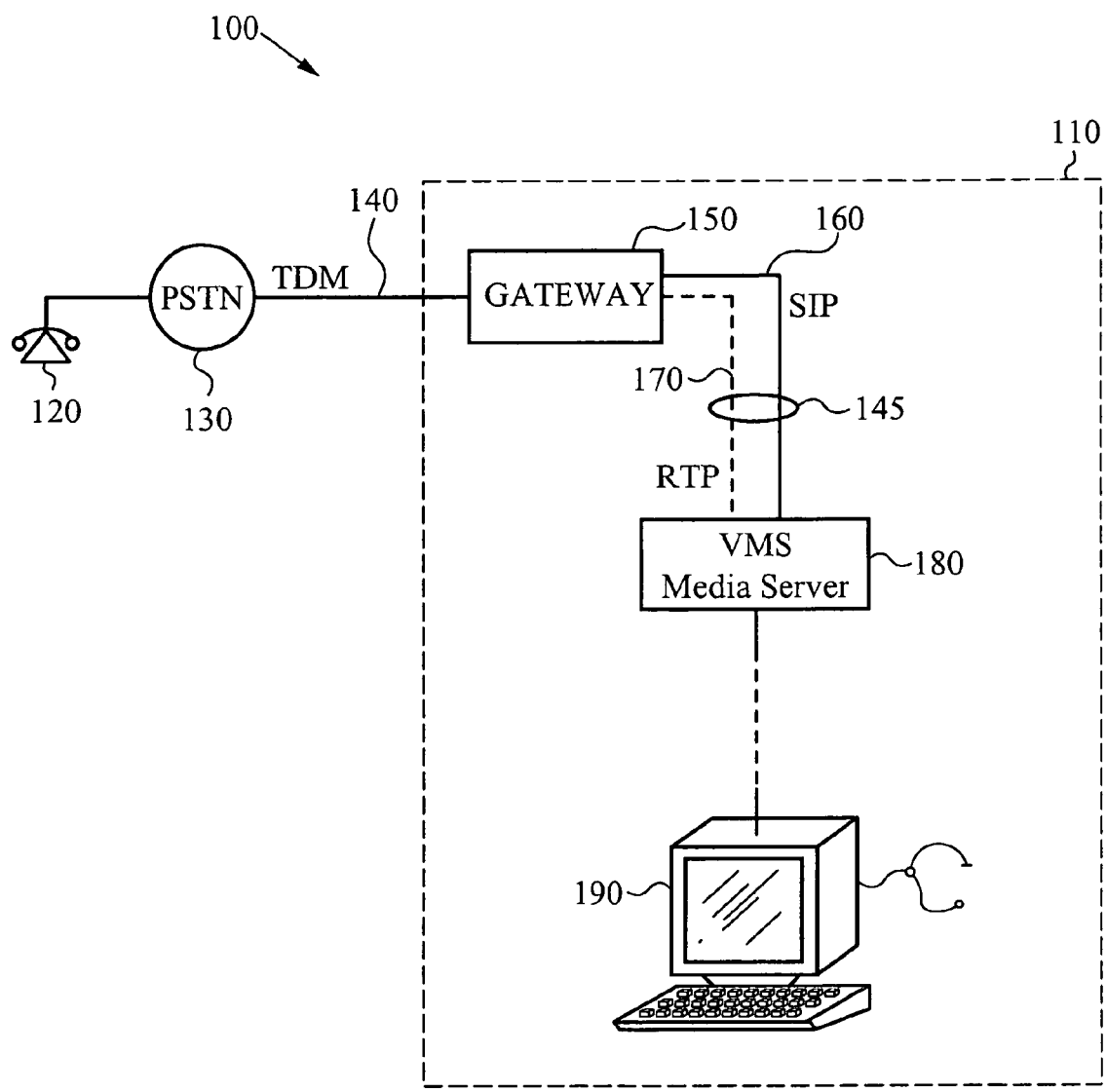
FIG. 1 illustrates a graphical representation of an exemplary VoIP network of an embodiment of the present invention.

A voice over internet protocol (VoIP) system 100 of an embodiment of the present invention is depicted in FIG. 1. A telephone 120 is utilized by a customer to connect to a VoIP contact center 110 through a public switch telephone network 130 or some other time division multiplexed (TDM) network 140. The customer call is received in the VoIP contact center 110 by a gateway 150. The gateway 150 splits the call into a session initiation protocol (SIP) portion 160 and a real time protocol (RTP) portion 170, sent to a media server (VMS) 180 and a workflow is started for that customer call. The SIP portion 160 of the call contains control signaling to facilitate the routing of the call while the RTP portion 170 of the call contains the actual voice data. The customer call is routed to an appropriate VMS 180 according to a predetermined set of routing criteria.

In the embodiment depicted in FIG. 1, the SIP portion 160 and the RTP portion 170 of the customer call are transmitted along a local transmission line 145 to the VMS 180. Once the customer call reaches the VMS 180, a workflow is started for that customer call. The workflow proceeds through a number of steps that must be completed for that particular customer call. Oftentimes, the workflow will require that the customer call be put on hold. In such a case, the VMS 180 sends an instruction signal through the local transmission line 145 to the gateway 150, instructing the gateway 150 to start an on-hold playback for that customer call. The gateway 150 is capable of starting a continuous pre-recorded or live stream to the telephone 120 through the PSTN 130. The on-hold playback may include music, advertisements or any information the owner of the VoIP contact center wants to relay to the customer while the customer is on hold. It should be noted that the preferred embodiment of the present invention utilizes a VMS 180 to send an instruction to the gateway 150. However, it has been contemplated that any server or other device that is a source of music on hold or controls the application of music on hold may send this instruction as well.

Still referring to FIG. 1, when the workflow is at a stage where the customer call is to be routed to an agent 190, the workflow will prompt the VMS 180 to send an instruction signal through the local transmission line 145 to the gateway 150, instructing the gateway 150 to stop the on-hold playback for that customer call. The VMS 180 will then transfer the customer call to the appropriate agent 190. Likewise, if the workflow requires a customer prompt or other message not in the on-hold playback to be sent to the customer, the workflow will also prompt the VMS 180 to send an instruction signal to the gateway 150 to stop the on-hold playback so that the customer prompt, e.g., "press 1 to continue holding, press 2 to leave a message for us to call you back," or message can be sent to the customer. After such a customer prompt or message is completed, the workflow will prompt the VMS 180 to send an instruction signal through the local transmission line 145 to the gateway 150, instructing the gateway 150 to start the on-hold playback for that customer call once again. It should be noted that the preferred embodiment of the present invention utilizes explicit instruction signals to start or stop the on-hold playback. However, it has been contemplated that standard VoIP signaling commands from the VMS 180 such as, but not limited to, "no longer listening" or "resuming listening" may be implicitly utilized to start or stop the on-hold playback.

Still referring to FIG. 1, the on-hold playback is selected from a number of on-hold playback tracks. Also, the other messages that may be interspersed during the customer call's on-hold time are each part of an announcement stack. An announcement stack includes a number of related announcements targeted toward a particular customer type. When the workflow prompts the VMS 180 to send the gateway 150 an instruction to start the on-hold playback, the instruction signal will also include instructions from the gateway regarding which on-hold playback track to play, which announcement stack to select and frequency of the announcements. Each announcement in the announcement stack will play at the desired frequency and the announcement stack will continue from the beginning, when the last announcement in the stack is played. Factors that may determine the particular on-hold playback track and announcement stack include, but are not limited to, the type of call, the call origin and caller information.

Still referring to FIG. 1, when the workflow prompts the VMS 180 to send an instruction signal to the gateway 150 to stop the on-hold playback, the gateway 150 will remember the interruption point where the on-hold playback track was stopped. Subsequently, if the agent wishes to put the call back on hold and the instruction signal is sent to start the on-hold playback, the on-hold playback track will re-start at the interruption point. Furthermore, if an announcement is interrupted when the call is connected, upon subsequently being put back on hold, the on-hold playback track will be started at the point the on-hold playback track was interrupted by the announcement. In the preferred embodiment, an interrupted announcement will not be re-started when a call is put back on hold.

The current embodiment of the present invention depicted in FIG. 1 reduces the bandwidth required in systems of the prior art those systems play music from the media server 180, thus consuming large portions of the bandwidth of the local transmission line 145. Furthermore, the local switchgear that control the local transmission lines 145 have packet transfer limitations. By implementing the present invention as described above, those limitations are greatly reduced. It should be understood that alternative embodiments of the present invention may include any network in place of the TDM 140, PSTN 130 and telephone 120, as depicted in FIG. 1. Alternative embodiments may include, but are not limited to, a PBX network, a carrier network or another VoIP network. This should be understood not only in reference to FIG. 1, but in reference to the remaining figures as well.

Figure 2:
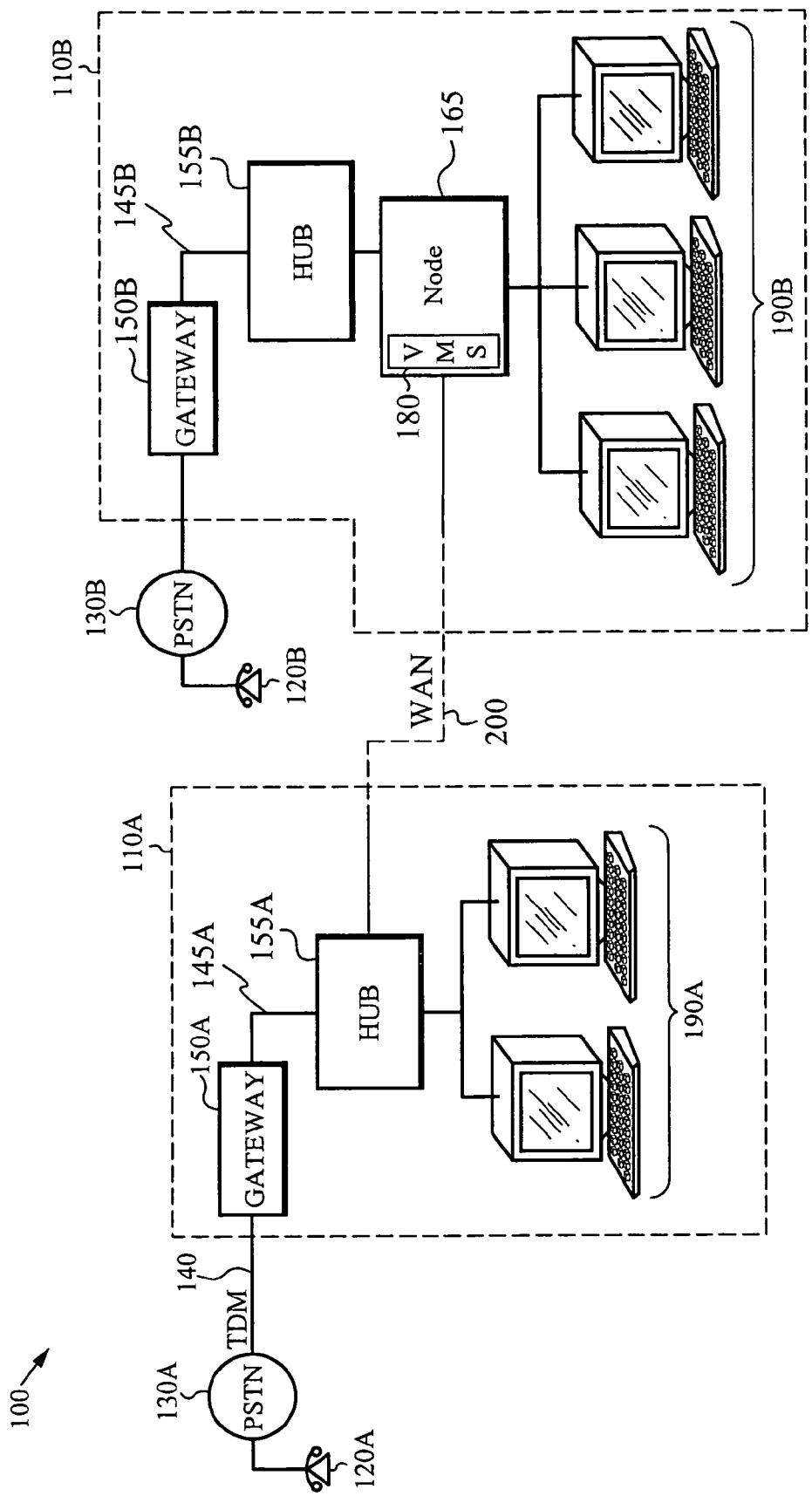
FIG. 2 illustrates a graphical representation of an exemplary VoIP network of an embodiment of the present invention.

A VoIP system 100 of the preferred embodiment of the present invention is depicted in FIG. 2. Here, a first contact center 110A and a second contact center 110B are connected by a wide area network (WAN) 200. Such a configuration may occur when a contact center 110A, B has a separate hubs 155A, B in two different cities. The WAN 200 may connect contact centers 110A, B mere miles apart or contact centers 110A, B on the other side of the globe. In any event, WAN 200 bandwidth is expensive and should be conserved in order to operate an efficient contact center 110A, B. It should be understood that additional contact centers 110A,B may be implemented and connected through WAN 200 or local transmission lines 145 (FIG. 1) as required, and that the contact center 110A, B depicted in FIG. 2 is intended to illustrate the preferred embodiment of the present invention. It should also be understood that alternative embodiments may include a VoIP system 100 having a use application other than a contact center 110. Again, alternative embodiments may include a PBX network.

Referring still to FIG. 2, when a customer call originating from a first telephone 120A is received in a first gateway 150A of a first contact center 110A through a first PSTN 130A or other TDM network 140, the first gateway 150A must determine the appropriate VMS 180 to route the customer call according to predetermined routing criteria. While it is not shown, numerous contact centers 110A, B having additional VMS 180 units may be implemented in any given VoIP system 100. When a customer call is routed to a VMS 180 in a second contact center 110B, a WAN 200 is utilized to connect the VMS 180 to the first gateway 150A through a first hub 155A. When the customer call is routed to the VMS 180, a workflow is once again started for that customer call.

The workflow proceeds through a number of steps that must be completed for that particular customer call. Oftentimes, the workflow will require that the customer call be put on hold. In such a case, the VMS 180 sends an instruction signal through the WAN 200 to the first gateway 150A, instructing the first gateway 150A to start an on-hold playback for that customer call. The first gateway 150A is capable to start a continuous pre-recorded or live stream to the first telephone 120A through the first PSTN 130A. Once again, the on-hold playback may include music, advertisements or any information the owner of the VoIP contact center wants to relay to the customer while the customer is on hold.

Still referring to FIG. 2, when the workflow is at a stage where the customer call is to be routed to an agent 190B in the second contact center 110B, the workflow will prompt the VMS 180 to send an instruction signal through the WAN 200 to the first gateway 150A, instructing the first gateway 150A to stop the on-hold playback for that customer call. The VMS 180 will then transfer the customer call to the appropriate agent 190B. Likewise, if the workflow requires a customer prompt or other message not in the on-hold playback to be sent to the customer, the workflow will also prompt the VMS 180 to send an instruction signal to the first gateway 150A to stop the on-hold playback so that the customer prompt, e.g., "press 1 to continue holding, press 2 to leave a message for us to call you back," or message can be sent to the customer. After such a customer prompt or message is completed, the workflow will determine if continued holding was selected and prompt the VMS 180 to send an instruction signal through the WAN 200 to the first gateway 150A, instructing the first gateway 150A to start the on-hold playback for that customer call once again. Likewise, the workflow will prompt the VMS 180 to send an instruction signal through the WAN 200 to the first gateway 150A, instructing the first gateway 150A to start the on-hold playback for that customer when the agent needs to put the customer on-hold for any reason.

The preferred embodiment of the present invention depicted in FIG. 2 reduces the bandwidth required in systems of the prior art those systems play music from the media server 180, thus consuming large portions of the bandwidth of the WAN 200. The reduction in bandwidth usage can be realized when a VoIP system 100 utilizing the present invention is able to utilize the WAN 200 for relatively short instruction signals, rather than continuous on-hold playbacks to hundreds, or even thousands of customer calls. Furthermore, as stated previously, FIG. 2 is exemplary to illustrate the preferred embodiment of the present invention. Many VoIP systems 100 utilize additional contact centers 110A, B, connected by additional WANs 200, and effectuate a customer call being connected through a number contact centers 110A, B over numerous WANs 200. Thus, the present invention reduces bandwidth usage over all the WANs 200 in a given VoIP system 100 by limiting the WANs to instruction signals, rather than continuous on-hold playbacks. A further advantage of the present invention is that by placing the on-hold playback responsibilities in the gateway 150A, B, advertisements and messages are localized, allowing national as well as local advertising to be relayed to the customer through the on-hold playback.

Figure 3:
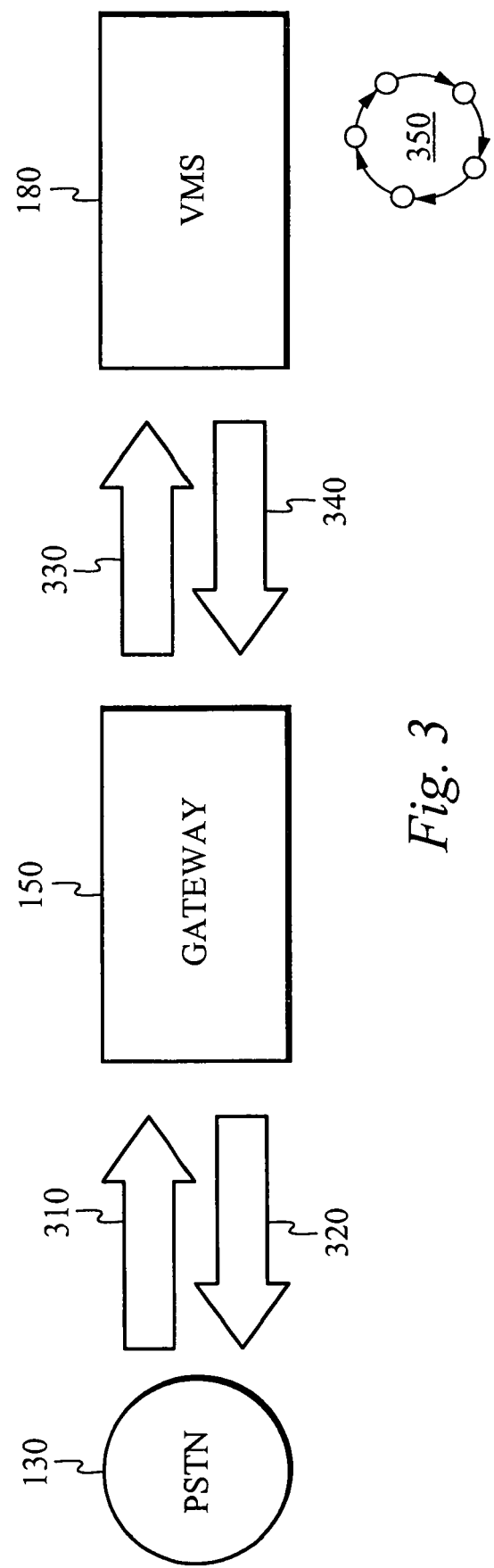
FIG. 3 illustrates a schematic diagram of an embodiment of the present invention.

A schematic block diagram of an embodiment of the present invention is depicted in FIG. 3. Here, the PSTN 130 (or other network) provides the gateway 150 with a customer call 310. The gateway 150, in turn, routes 330 the call to the VMS 180 and a workflow 350 is started for that call. It should be noted that while the workflow 350 may be located in the VMS 180, it can also be located in other parts of the VoIP system such as, but not limited to, the application server. As described previously, instruction signals 340 are sent by the VMS 180 to the gateway 150, according to prompts by the workflow 350. The instructions signals 340 may instruct the gateway 150 to start or stop an on-hold playback 320 to the customer through the PSTN 130.

Figure 4:
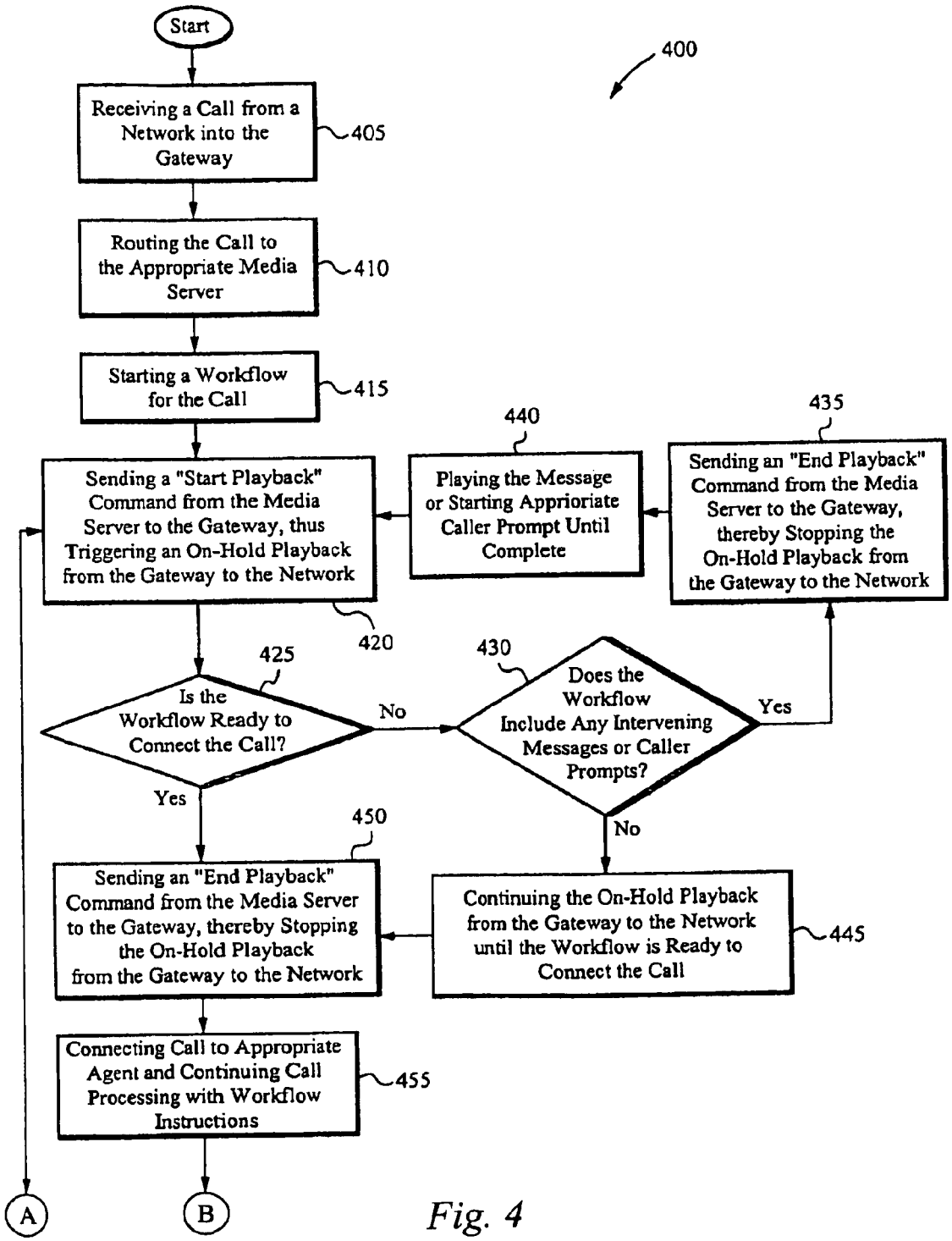
FIG. 4 illustrates a flow chart representation of a method of an embodiment of the present invention.
Figure 4:
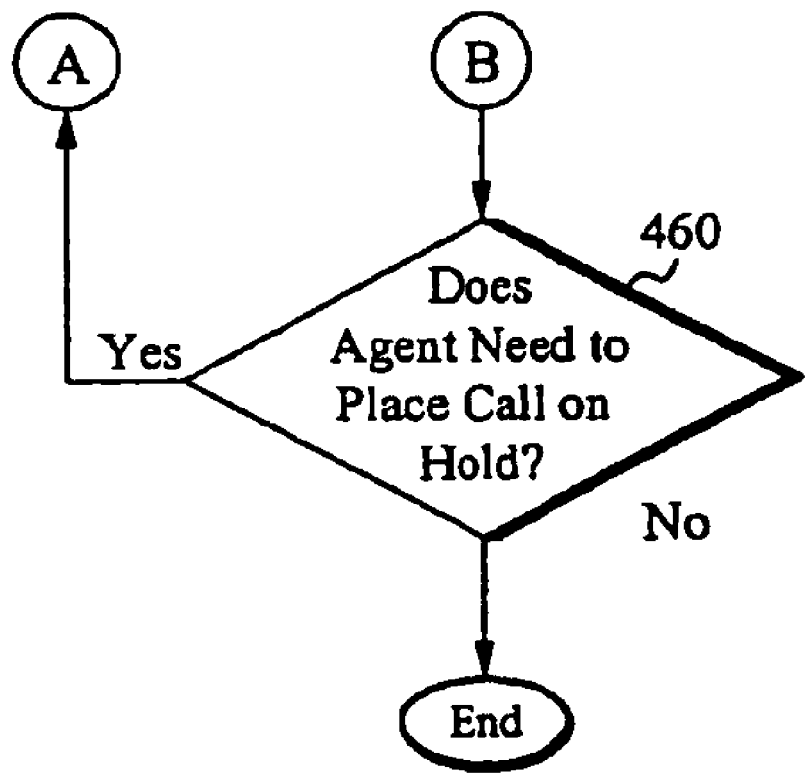

A method of reducing bandwidth usage 400 of an embodiment of the present invention is depicted in FIG. 4. In step 405, the gateway receives a call from a network. In step 410, the call is routed to an appropriate media server according to predetermined routing criteria. In step 415, a workflow is started for the call. In step 420, the workflow sends a "start playback" instruction signal from the media server to the gateway, thus triggering an on-hold playback from the gateway to the network. In step 425, if the workflow is ready to connect the call to an agent, then in step 450, an "end playback" instruction signal is sent from the media server to the gateway, thereby stopping the on-hold playback from the gateway to the network, and the call is connected to the appropriate agent in step 455. If the workflow is not ready to connect the call in step 425, then the method continues on to step 430.

Still referring to FIG. 4, in step 430, if the workflow does not include any intervening messages or caller prompts, then in step 445, the on-hold playback from the gateway to the network is continued until the workflow is ready to connect the call. The method then proceeds to step 450. If in step 430, the workflow does include intervening messages not in the on-hold playback or caller prompts, then in step 435, an "end playback" instruction signal is sent from the media server to the gateway, thereby stopping the on-hold playback from the gateway to the network. Then, in step 440, the message is played or the caller prompt is started until completion, at which time the "start playback" instruction signal is again sent in step 420.

Still referring to FIG. 4, after the call is connected to the appropriate agent in step 455, the agent may be required to put the call on hold for a variety of reasons, such as to access additional caller information, as a supervisor a question, or even to transfer the call. If the agent does need to place the call on hold, then the method continues back to step 420. If the agent does not need to place the call on hold, then the method ends.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the method and system of the present invention could be implemented in several different ways and have several different appearances.

What is claimed is:

1. A method of reducing bandwidth usage in a voice over internet protocol network, the method comprising:
   a. receiving a customer call in a gateway from a network;
   b. routing the customer call to a media server;
   c. sending an instruction signal from the media server to the gateway, wherein the instruction signal prompts the gateway to start or stop an on-hold playback from the gateway to a customer; and
   d. starting a workflow operable to control operation of said media server with respect to the customer call when the customer call is routed to the media server, wherein the workflow determines when the instruction signal is sent to the gateway, an on-hold playback track, an announcement stack and an announcement frequency.

2. The method as claimed in claim 1 wherein the instruction signal is a start playback signal when the customer call is put on hold, further wherein the start playback signal prompts the gateway to start the on-hold playback.

3. The method as claimed in claim 1 wherein the instruction signal is an end playback signal when the customer call is taken off hold, further wherein the end playback signal prompts the gateway to stop the on-hold playback.

4. The method as claimed in claim 3 further comprising saving an interruption point of the on-hold playback when the end playback signal prompts the gateways to stop the on-hold playback.

5. The method as claimed in claim 1 wherein said workflow further determines when a message or a caller prompt is to be presented to said customer call by said media server, said method further comprising starting said message or caller prompt after the end playback signal is sent.

6. The method as claimed in claim 1 wherein said workflow further determines when the customer call is to be connected to an agent by said media server, said method further comprising connecting the customer call to said agent after the end playback signal is sent.

7. The method as claimed in claim 6 wherein when the agent places the customer on hold, the instruction signal is re-sent from the media server to the gateway to start the on-hold playback from the gateway to the customer, and the on-hold playback starts from the interruption point and an interrupted announcement will not be restarted from the interruption point.

8. The method as claimed in claim 1 wherein the instruction signal is sent to the gateway over a local connection.

9. The method as claimed in claim 1 wherein the instruction signal is sent to the gateway over a wide area network.

10. The method as claimed in claim 1 wherein the network is a time division multiplexed network.

11. The method as claimed in claim 10 wherein the time division multiplexed network is a public switched telephone network.

12. The method as claimed in claim 1 wherein the network is a voice over internet protocol network.

13. A system for reducing bandwidth usage in a voice over internet protocol network, the system comprising:
   a. means for receiving a customer call from network;
   b. means for routing the customer call to a server for voice interaction between said customer call and said server;
   c. means for instructing the means for receiving the customer call,
   wherein the instructing means prompts the means for receiving the customer call to start or stop an on-hold playback from the means for receiving the customer call to a customer; and
   d. means for starting a workflow operable to control operation of said server with respect to the customer call when the customer call is routed to the server, wherein the workflow determines when the instructing means prompts the gateway, an on-hold playback track, an announcement stack and an announcement frequency.

14. The system as claimed in claim 13 wherein the instructing means sends a start playback signal when the customer call is put on hold, further wherein the start playback signal prompts the gateway to start the on-hold playback.

15. The system as claimed in claim 13 wherein the instructing means sends an end playback signal when the customer call is taken off hold, further wherein the end playback signal prompts the gateway to stop the on-hold playback.

16. The system as claimed in claim 15 further comprising means for saving an interruption point of the on-hold playback when the end playback signal prompts the gateways to stop the on-hold playback.

17. The system as claimed in claim 13 wherein said workflow further determines when a message or caller prompt is to be presented to the customer call, said system further comprising means for said server presenting said message or caller prompt to the customer call after the end playback signal is sent.

18. The system as claimed in claim 13 wherein said workflow further determines when the customer call is to be connected to an agent, said system further comprising means for connecting the customer call to said agent after the end playback signal is sent.

19. The system as claimed in claim 18 wherein when the agent places the customer on hold, the instructing means prompts the gateway to start the on-hold playback from the gateway to the customer, and the on-hold playback starts from the interruption point and an interrupted announcement will not be re-started from the interruption point.

20. The system as claimed in claim 13 wherein the instructing means prompts the gateway over a local connection.

21. The system as claimed in claim 13 wherein the instructing means prompts the gateway over a wide area network.

22. The system as claimed in claim 13 wherein the network is a time division multiplexed network.

23. The system as claimed in claim 22 wherein the time division multiplexed network is a public switched telephone network.

24. The system as claimed in claim 13 wherein the network is a voice over internet protocol network.

25. A system for reducing bandwidth usage in a voice over internet protocol network, the system comprising:
   a. a gateway configured to receive a customer call from a network, and further configured to route the customer call;
   b. a media server coupled to the gateway, wherein the media server is configured to receive the customer call from the gateway for voice interaction therewith, and further configured to send an instruction signal to the gateway,
   wherein the instruction signal prompts the gateway to start or stop an on-hold playback from the gateway to a customer; and
   c. a workflow operable to control operation of the media server with respect to the customer call and configured to be started when the customer call is routed to the media server, wherein the workflow determines when the instruction signal is sent to the gateway, an on-hold playback track, an announcement stack and an announcement frequency.

26. The system as claimed in claim 25 wherein the instruction signal is a start playback signal when the customer call is put on hold, further wherein the start playback signal prompts the gateway to start the on-hold playback.

27. The system as claimed in claim 25 wherein the instruction signal is an end playback signal when the customer call is taken off hold, further wherein the end playback signal prompts the gateway to stop the on-hold playback.

28. The system as claimed in claim 27 wherein the gateway records an interruption point of the on-hold playback when the end playback signal prompts the gateways to stop the on hold playback.

29. The system as claimed in claim 25 wherein the workflow further determines when a message or caller prompt is to be presented to the customer call by the media server, and wherein said message or caller prompt is started after the end music playback is sent.

30. The system as claimed in claim 25 wherein the workflow further determines when the customer call is to be connected to an agent, and wherein the customer call is connected to the agent after the end playback signal is sent.

31. The system as claimed in claim 30 wherein when the agent places the customer on hold, the instruction signal is re-sent from the media server to the gateway to start the on-hold playback from the gateway to the customer, and the on-hold playback starts from the interruption point and an interrupted announcement will not be restarted from the interruption point.

32. The system as claimed in claim 25 wherein the instruction signal is sent to the gateway over a local connection.

33. The system as claimed in claim 25 wherein the instruction signal is sent to the gateway over a wide area network.

34. The system as claimed in claim 25 wherein the network is a time division multiplexed network.

35. The system as claimed in claim 34 wherein the time division multiplexed network is a public switched telephone network.

36. The system as claimed in claim 25 wherein the network is a voice over internet protocol network.

37. A method of reducing bandwidth usage in a voice over internet protocol network, the method comprising:
   receiving a customer call in a gateway from a network;
   routing the customer call to a media server;
   sending an instruction signal from the media server to the gateway, wherein the instruction signal prompts the gateway to start or stop an on-hold playback from the gateway to a customer; and
   starting a workflow operable to control operation of said server with respect to the customer call when the customer call is routed to the media server, wherein the workflow determines when the instruction signal is sent to the gateway, an on-hold playback track, an announcement stack and an announcement frequency,
   wherein the instruction signal is a start playback signal when the customer call is put on hold and the start playback signal prompts the gateway to start the on-hold playback, and further wherein the instruction signal is an end playback signal when the customer call is taken off hold and the end playback signal prompts the gateway to stop the on-hold playback.

38. The method as claimed in claim 37 further comprising saving an interruption point of the on-hold playback when the end playback signal prompts the gateways to stop the on-hold playback.

39. The method as claimed in claim 38 further comprising starting a message or a caller prompt after the end playback signal is sent.

40. The method as claimed in claim 38 further comprising connecting the customer call to an agent after the end playback signal is sent.

41. The method as claimed in claim 40 wherein when the agent places the customer on hold, the instruction signal is re-sent from the media server to the gateway to start the on-hold playback from the gateway to the customer, and the on-hold playback starts from the interruption point and an interrupted announcement will not be restarted from the interruption point.

42. The method as claimed in claim 37 wherein the instruction signal is sent to the gateway over a local connection.

43. The method as claimed in claim 37 wherein the instruction signal is sent to the gateway over a wide area network.

44. The method as claimed in claim 37 wherein the network is a time division multiplexed network.

45. The method as claimed in claim 44 wherein the time division multiplexed network is a public switched telephone network.

46. The method as claimed in claim 37 wherein the network is a voice over internet protocol network.

* * * * *